United States Patent
Anheuer et al.

(10) Patent No.: US 6,853,541 B2
(45) Date of Patent: Feb. 8, 2005

(54) COMPACT CONVERTER STATION

(75) Inventors: Mathias Anheuer, Oberasbach (DE); Kurt Friedrich, Nürnberg (DE); Dag Soerangr, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 10/178,787

(22) Filed: Jun. 25, 2002

(65) Prior Publication Data

US 2003/0235026 A1 Dec. 25, 2003

(51) Int. Cl.⁷ .................................................. H02B 5/00
(52) U.S. Cl. ........................ 361/602; 361/604; 361/611
(58) Field of Search .................................. 361/602, 604, 361/611, 1, 103, 622

(56) References Cited

U.S. PATENT DOCUMENTS 3,629,685 A  * 12/1971  Johansson ..................... 363/51
5,644,485 A  *  7/1997  Asplund ....................... 363/129
5,715,151 A  *  2/1998  Moriura ........................ 363/54

* cited by examiner

Primary Examiner—Stephen W. Jackson
(74) Attorney, Agent, or Firm—Morrison & Foerster LLP

(57) ABSTRACT

In order to provide a converter station for a high-voltage DC connection between two three-phase AC voltage networks, having a converter building which has a number of floors, and in which transformer units, converter devices, filter units, a gas-insulated switchgear assembly with feeder units, at least one cooling system, a DC cable pot head for electrical connection of a high-voltage cable carrying direct current, a smoothing reactor and gas-insulated busbars for electrical connection of these components are arranged, while maintaining its compact design and the arrangement of its components in a closed building, whose cost is low and which has a physically simple design, the invention proposes that the DC cable pot head and the smoothing reactor are arranged on the same floor as the converter valves and are electrically connected to one another via an air-insulated connecting device, with an air-insulated isolating switch being provided in order to produce an isolating gap between the DC cable pot head and the smoothing reactor.

8 Claims, 5 Drawing Sheets

COMPACT CONVERTER STATION

TECHNICAL FIELD OF THE INVENTION

The invention relates to a converter station for a high-voltage DC connection between two three-phase AC voltage networks.

BACKGROUND OF THE INVENTION

A converter station is known from the lecture "A study of +/−500 kV, 2400 MW compact converter station", whose authors were D. E. Fletcher, D. L. Gordon, R. E. Harrison, M. A. Lebow and R. Mauro at the "IEE International Conference on AC and DC Power Transmission" on Sep. 17–20, 1991, and was published in London, United Kingdom, under the ISBN Number 0-85296-517-6, in 1991, on pages 165–170 of Volume 345 of "AC and DC Power Transmission". The design described there for a compact converter station develops a concept for the accommodation of a converter station for high-voltage DC transmission in a closed multistory building. The converter station has converter valves which extend over a number of floors and are mounted in a suspended fashion in valve halls. Filter units are provided on the top floor of the converter building, and above the valve halls, in order to suppress the harmonics, which occur during conversion, in the three-phase network. Three transformer cells with a transformer unit as well as a reactor chamber with an oil-cooled smoothing reactor are arranged on the first floor, alongside the valve halls. An underground Cable room is provided between the valve halls and the transformer cells. The connections of a three-phase AC cable penetrate project into the cable room, with the electrical power being carried within the building by gas-insulated busbars or cables, some of which extend through the cable ducts.

The DC voltage which is coming to to the converter station is first of all connected to the oil-cooled smoothing reactor; and is supplied to the converter valves via a deacated bushing. Once the direct current has been converted to alternating current, the AC voltage which is produced has its voltage changed by the transformer unit to an AC voltage that is intended for further distribution, while AC filter units are used to remove the harmonics, some of which are produced, during the conversion process. After voltage conversion and filtering, the alternating current is fed to the desired AC network via an AC cable which penetrates into the cable area. For power interruption and for no-load disconnection flowing, gas-insulated switchgear assemblies are provided on both the DC side and the AC side in the building, and are arranged on the fourth and fifth floors, above the transformer chamber.

The objective of the design described above is to reduce the physical volume of conventional converter stations. As a rule, conventional converter stations are arranged in low-population regions, so that it is possible to make use of the availability of a sufficiently large amount of space. Conventional converter stations are thus designed as open-air installations, and cover large areas. The known design discloses ideas to make it possible to offer converter stations at a low cost in densely populated regions where the land prices are high, while at the same time maintaining the aim of complying with standard safety requirements.

The described design of a converter station is subject to the disadvantage that implementation of the design would be costly and would lead to a physically interleaved building in order to accommodate the converter station.

The lecture by P. Lips, "Compact HVDC Converter Station Design Considerations" which appeared in "IEEE Transactions on Power Apparatus and Systems, Vol. PAS-9.5, No. 3 (1976)", discloses a converter station to be arranged in a multistory building. Smoothing reactors, transformer units and converter valves are arranged on the first floor in the building disclosed there. On the floor above this, DC cable terminations are each electrically connected to an isolating switch in order to interrupt the DC connection in an inert gas atmosphere, with the isolating switch being connected to the smoothing reactor via a gas-insulated conductor connection. The gas insulated conductor is routed, which across a number of floors, between the DC cable termination, the isolating switch and the smoothing reacotor, is however, associated with additional cost. Furthermore, with a design such as this, the high-voltage DC cables which are routed to the station should be routed in a complex manner via the basement, passing by the oil-cooled DC smoothing reactors which are arranged on the first floor, to the DC cable pot-head on the second floor. An appropriately running cable riser duct is therefore provided in the above-mentioned converter station and is equipped in a costly manner with fire barriers in order to prevent fire from propagating between the different floors.

SUMMARY OF THE INVENTION

The invention relates to a converter station for a high-voltage DC connection between two three-phase AC voltage networks, having a converter building which has a number of floors, and in which transformer units, converter valves, filter units, a gas-insulated switchgear assembly with feeder units, at least one cooling system, a DC cable pot-head for electrical connection of a high-voltage cable carrying direct current, a smoothing reactor and gas-insulated busbars for electrical connection of these components are arranged.

The invention provides a converter station whose cost is low while maintaining its compact design. The arrangement of its components in a closed building, with a simple structure,, so that it is possible to operate the converter station in densely populated regions.

The invention, in one embodiment, has a DC cable pot-head and smoothing reactor arranged on the same floor as the converter valves, and are electrically connected to one another via an air-insulated connecting device, with an air-insulated isolating switch being provided in order to produce an isolating gap between the DC cable termination and the smoothing reactor.

According to one embodiment of the invention, air-insulated connecting means are used between the DC cable pot-head and the smoothing reactor instead of the gas-insulated connecting device which cannot be switched or disconnected, or can be switched or disconnected in a complex manner, and the air-insulated connecting device has a considerably simpler design, and are thus more cost-effective. The no-load isolating is likewise air-insulated and cost-effective, while furthermore allowing the connection between these two components to be disconnected, so that this provides reliable control capability for the converter station, which can be operated in both energy flow directions. The air-insulation of the no-load isolating switch and of the connecting device, which pass through at least one DC switchgear assembly area repeatedly make it necessary to maintain greater clearances from the boundary walls of the respective DC switchgear assembly area, so that this is somewhat larger than in areas which are designed appropriately for gas-insulated connecting devices. Its design should take into account not only of the cleareances between boundary walls and connecting device and isolating switches required to avoid electrical flashovers, but also the maximum bending radius for the DC cable. It has been found that the height of a DC switchgear assembly area designed in this way corresponds essentially to the height of valve hall in which the converter valves are arranged. The arrangement of the DC switchgear assembly area and of the valve hall on one floor, according to the invention, simplifies the design of the converter building. In addition, the avoidance of an interleaved design of the converter building makes it possible to compensate to a very large extent for the increase in the space required by the air insulation. According to the invention, this results in a cost-effective converter station which is at the same time compact. Furthermore, according to the invention, conventional components, which are known from their use in outdoor installations, are used in a multistory compact building. Despite the use of conventional components, the converter station according to the invention is compact, and it is possible to make use of components which have been found from experience to operate reliably, for the design and operation of the converter station.

According to another embodiment of the invention, the DC cable pot-head and the smoothing reactor are arranged jointly in a DC switchgear assembly area. Arranging the air-insulated smoothing reactor and the air-insulated DC cable pot head in a DC switchgear assembly area means that there is no need for any additional high-voltage bushing, which would result in additional costs.

The filter units preferably comprise reactors, capacitor banks and clamping resistors, with the resistors being arranged on the roof of the converter building. When current flows through them, the resistors are heated and cooled. With conventional outside temperatures, air cooling without any fan is generally sufficient for this purpose. Since resistors are low-noise components, it is expedient firstly with respect to the compact configuration of the converter station and secondly with respect to environmental noise affecting those living in the vicinity, to arrange the resistors of the filter units on the roof of the converter building, while the reactors and capacitor banks of the filter units are arranged in the interior of the converter building.

Accordingly to still another embodiment, silencers are arranged in the converter building. The silencers may, for example, be perforated wall claddings, which form Helmholz resonators that are matched to the respective frequency ranges to be damped. Furthermore, other silencing materials such as foams or the like may also be used.

Each cooling system preferably has at least one fan, which is arranged in the interior of the converter building. The fans for a heat exchanger generally represent a considerable noise source. They are thus arranged in the interior of the building, thus reducing the environmental noise level for potential residents.

According to yet another embodiment, the fan is arranged in a cooling system area and takes in and/or blows out the air through ventilation areas. The additional ventilation area may be designed independently of the cooling system area in terms of silencing, but the dimensions and arrangement of the fans should be taken into account in its design. Furthermore, the fans are no longer arranged directly on the outside wall of the overall building, thus likewise resulting in a reduction in noise.

Water cooling is preferably provided for cooling the transformer unit oil. This further development of the invention means that there is no need for noisy fan air cooling in the immediate vicinity of the transformer. Owing to its heavy weight, the transformer unit should preferably be accommodated on the first floor of the converter building. Fan air cooling for the transformer units in the lower region of the building, which is particularly sensitive for environmental noise and air currents, would be particularly disadvantageous owing to the fan noise which would be produced in addition to the other machine noise. For this reason, a secondary water circuit was used for cooling the transformer unit oil, whose heat exchanger can be arranged on the upper floors, with the cooling water being passed through the building by means of a pipe system, for example. The heat exchanger is cooled by an air fan. This means that it is possible to remove the noisy fan, which produces a considerable air flow, further away from the lower floors. The air cooling of the transformer units can advantageously be restricted to dissipation of the tank emission losses from the transformer units.

The transformer unit is preferably arranged on a side of the building which does not face any residential area but, by way of example, faces other industrial or storage buildings.

In another embodiment of the invention, the transformer units do not have additional winding taps or additional windings for a tertiary AC voltage. Transformers such as these, are in particular, more cost-effective and, furthermore, have advantages with regard to harmonic filtering by the filter units.

At least one internal fire-resistant fire barrier wall is advantageously provided in the converter building and is arranged at a distance from an outside wall, forming a ventilation shaft, with an inner ventilation gap being provided in the fire barrier wall and an outer ventilation gap being provided in the outside wall. The ventilation gaps are arranged at mutually different wall heights in order to prevent flames from emerging from the outside wall. According to this embodiment of the invention, areas which are fire-resistant but are nevertheless ventilated at the same time are provided within the converter building. The outside air is allowed to enter the building through the outer ventilation gap. From there, the air which has entered the building reaches the inner ventilation gap once it is passed through a distance corresponding to the difference in the wall height of the ventilation gaps, within the ventilation shaft. The air which enters through the inner ventilation gap has thus had its direction changed twice. A flame which develops in the interior would likewise have to have its direction changed twice before emerging from the building. The double direction change reduces, however, the risk of flames emerging in the event of a fire.

According to still another embodiment, a heat-sensitive expanding device, whose natural volume increases as a function of their temperature, is arranged between the outer ventilation gap and the inner ventilation gap in the ventilation shaft. In the event of a fire, the natural volume of an expanding device increases sufficiently to prevent further ventilation through the ventilation gaps. Furthermore, this also retards flames, burning gases or smoke from emerging from the converter building.

BRIEF DESCRIPTION OF THE DRAWINGS

Further expedient refinements and advantages of the invention are the subject matter of the following description of exemplary embodiments of the invention, with reference to the figures of the drawing, with corresponding components being provided with the same reference symbols and, in which.

DETAILED DESCRIPTION OF THE PREFERRED EMBODIMENTS

Figure 1:
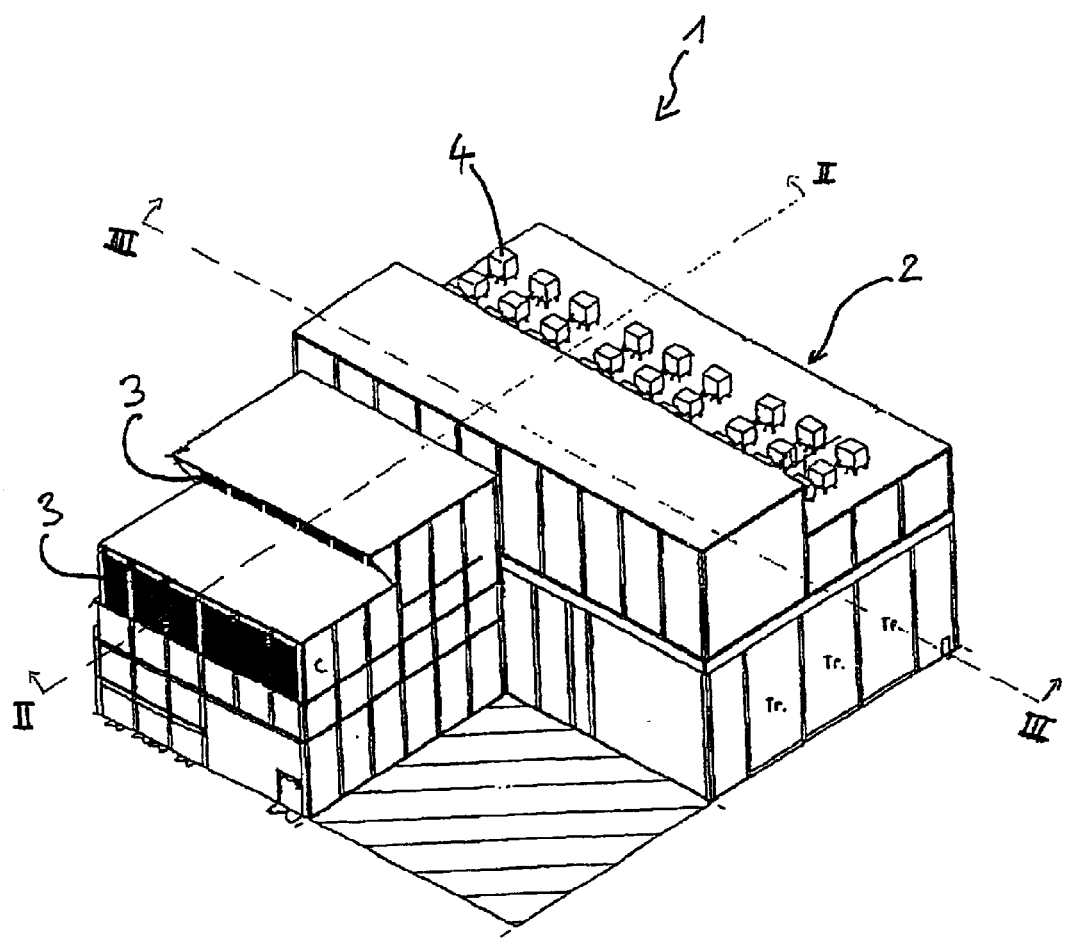
FIG. 1 shows an exemplary embodiment of the converter station according to the invention, in the form of a three-dimensional illustration.

FIG. 1 shows an exemplary embodiment of the converter station 1 according to the invention, in the form of a three-dimensional illustration. This illustration shows in particular that the components are arranged in or on a closed converter building 2, which has a number of floors. Ventilation openings 3 can be seen in the front region of the building 2, while resistors 4 which are arranged in the rear region on the roof of the converter building 1 are illustrated in the figures.

Figure 2:
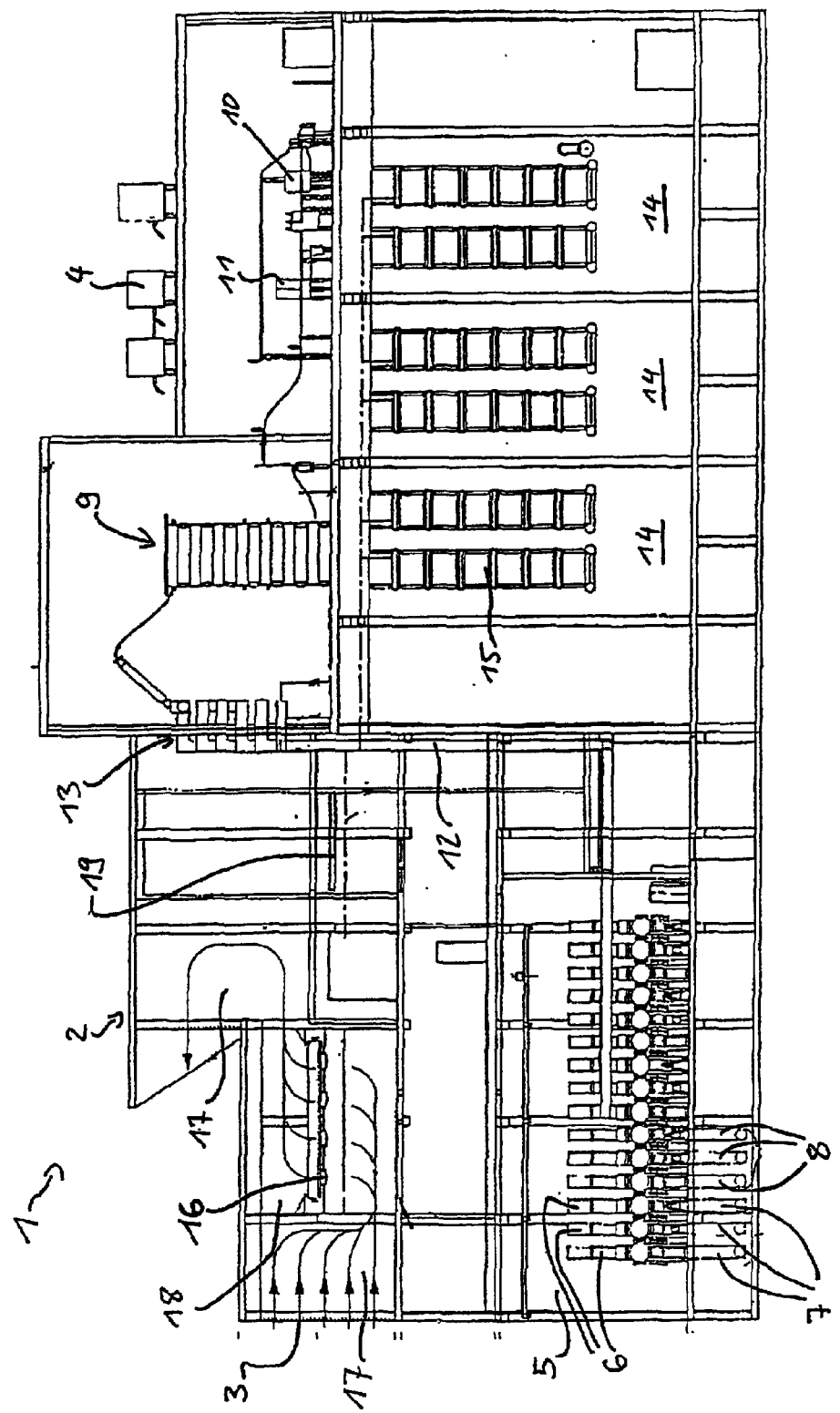
FIG. 2 shows a view of the converter station sectioned along the section line II as shown in FIG. 1.

FIG. 2 shows the converter station 1 in a view sectioned along the line II in FIG. 1. Gas-insulated feeder units 6 are arranged in a switching area 5 in the lower first floor. Sulfahexafluoride is used as the inert gas. Each phase in the first three-phase feeder unit 6 is connected to an AC cable 7, which is designed for feeding the power that is transmitted by means of high-voltage direct current to the converter station 1 to an AC network, which is not illustrated. However, the energy flow direction may also be reversed. The first three-phase feeder unit 6 thus makes it possible to disconnect the converter station 1 from this AC network. The adjacent three-phase feeder unit 6 is connected via connecting cables 8 to transformer units, which are not illustrated in FIG. 2, and is intended for disconnection, when required, of the transformers and of the converter valves 15 that are connected to them, for example in the event of a short circuit. The rest of the feeder units 6 are used for disconnection of filter units which are arranged on the upper floors and comprise high-voltage capacitor banks 9, the resistors 4, reactors 10 and medium-voltage capacitor banks 11. The feeder units 6 are in this case connected to the high-voltage capacitor banks 9 of the filter units via busbars 12 with inert gas insulation, as well as bushings 13.

The core of the converter installation is formed by six converter valves 15, which are arranged in an valve hall 14 and which, in the illustrated exemplary embodiment, are in the form of thyristors which can be triggered by optical fibers. The converter valves 15 are mounted with suspensions in the valve hall 14, for reasons of earthquake protection.

In order to keep noise sources as far away as possible from the ground area, for example from a road in a metropolitan area on which people live, heat exchangers with fans 16 are arranged in a cooling system area 18 on the upper floor. Ventilation areas 17 can be seen in the vicinity of the cooling system area 18, which, ventilation areas 17 are equipped with ventilation openings 3 and are provided, as illustrated by the arrows, for intake of ambient air and for outlet of heated air. The heat exchangers and fans 16 are part of a cooling system for cooling the converter valves 15, and of a cooling system for cooling transformers, which are not illustrated in FIG. 2. The cooling system for cooling the converter valves 15 comprises pipelines 19, which are illustrated only schematically, as well as pump units, ion exchangers and possible further filter units which are not illustrated in the figures, with deionized water being used for cooling and circulating permanently in the cooling system. The heat exchangers, which are coupled to a fan 16, provide the heat sink which is required for cooling.

The transformer unit, which is not illustrated in FIG. 2, is likewise cooled by water or by some other expedient circulating fluid such as a water/alcohol mixture, which is passed to the transformer unit via a separate system of pipelines. Heat exchangers together with the fans 16 are once again coupled to this separate pipe system. Thus, in this exemplary embodiment, two separate cooling circuits are used, each of which is cooled by separate heat exchangers with fans 16 attached to them. It is, of course, also possible for the heat exchangers and fans 16 to be in the form of separate individual components, within the scope of the invention.

Figure 3:
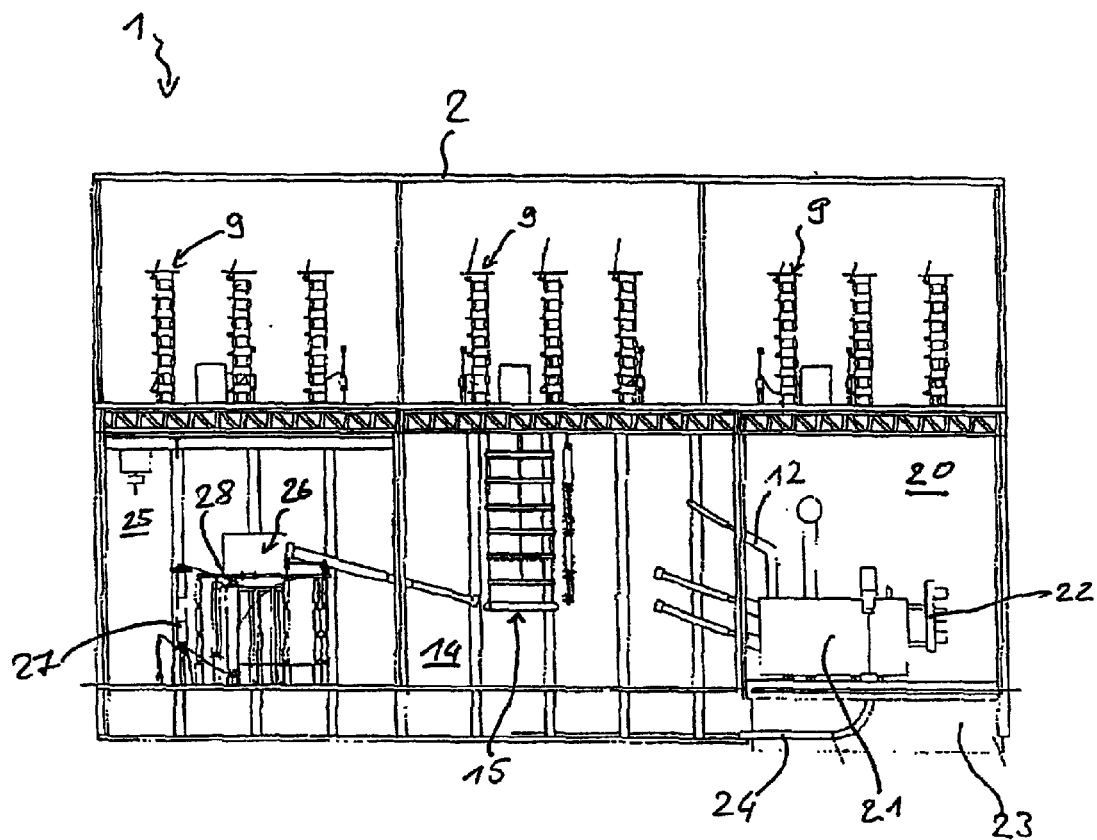
FIG. 3 shows a view of the converter station sectioned along the section line III as shown in FIG. 1.

FIG. 3 shows a view of the converter station 1, sectioned along the line III. A transformer unit 21, which has oil/water cooling 22, is arranged in a transformer area 20 on the lower floor. The transformer unit 21, which weighs several tons is advantageously located on the lower floor, and preferably on the first floor for simple installation. In order to minimize the problems caused by noise and air flows, particularly in the lower floors of the converter station 1, the oil/air cooling which is normally used for transformer units was replaced by oil/water cooling, so that the fan which is required for cooling the water that is circulating in the building can be arranged on the upper floors, and thus well away from locations or roads where people live. Water tanks and oil collecting sumps, in which cable ducts 24 provided for linking the high-voltage AC cables extend, but which are not illustrated in the figures, are located underneath the transformer area 20, that is to say in the basement area. Within the scope of the invention, it is also possible for the transformer unit 21 to be connected to the rest of the components of the converter station 1 via inert gas busbars 12, which in this case are insulated by $SF_6$.

The valve hall 14 with the converter valves 15 can be seen adjacent to the transformer area 20.

A DC switchgear assembly area 25, with a smoothing reactor 26 as well as a DC cable termination 27, is likewise arranged on the lower floor, and adjacent to the valve hall 14. The power to be transmitted is supplied via a high-voltage DC cable, which is not illustrated, to the converter station 1, with the DC cable ending in the DC switchgear assembly area 25, forming a DC cable termination 27. An Air-insulated connecting device, which are realized by conductors and connectors 28, extends between the DC cable termination 27 and the smoothing inductor 26. An air-insulated isolation switch 36 (FIG. 4) is integrated in the air-insulated conductors and connectors 28, in order to provide a sufficiently wide isolating gap between the smoothing reactor 26 and the DC cable termination 27.

Figure 4:
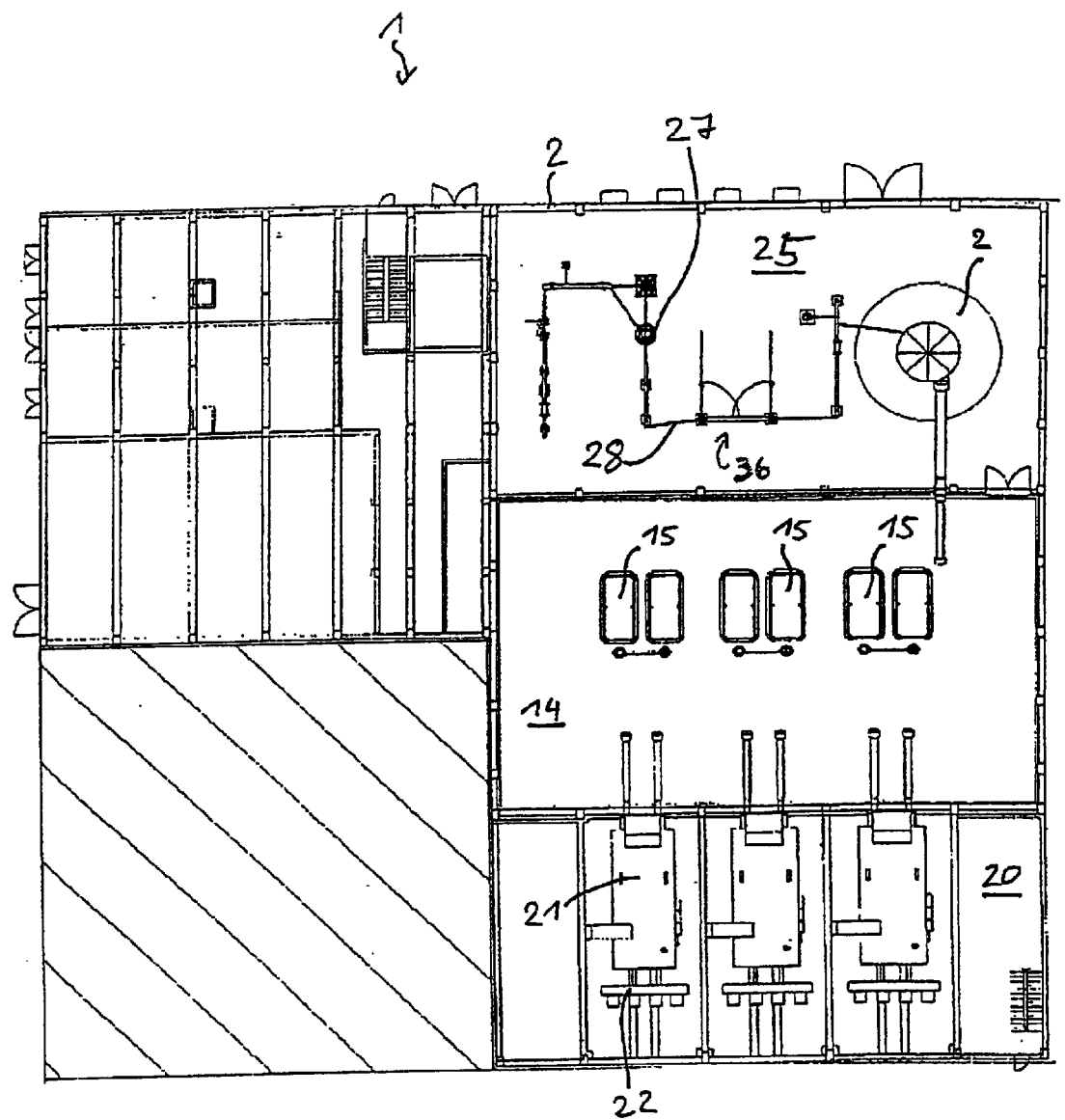
FIG. 4 shows a plan view of the lower floor of the converter station as shown in FIG. 1.

Owing to the air insulation, minimum distances from the boundary walls of the DC switchgear assembly area 25 have to be maintained for the DC cable pot head 27, for the conductors and connectors 28 and for the isolating switch 36 (FIG. 4). In this case, these distances amount to approximately five meters, based on a voltage of 500 kV. Furthermore, predetermined maximum bending radii have to be complied with when laying the high-voltage DC cable, so that this means that the DC cable termination should be at a certain minimum height. The DC switchgear assembly area 25 should be designed to be sufficiently large, for this reason. Thus, in order to provide a converter station 1 with a compact design, the DC switchgear assembly area 25 should be arranged adjacent to the valve hall 14, or at least on the same floor as the valve hall 14, which is set up to accommodate the converter valves 15, which cover a large area. In the chosen exemplary embodiment, the DC switchgear assembly area 25 is designed to accommodate the DC cable pot head and the smoothing reactor 26. There was thus no need for any additional high-voltage bushing.

The high-voltage capacitor banks 9 are arranged on the floor above the DC switchgear assembly area 25, the valve hall 14 and the transformer area 20.

FIG. 4 shows the lower floor, as illustrated in FIG. 3, in the form of a plan view. As can be seen, the DC cable pot head 27 is electrically connected to the smoothing reactor 26 via air-insulated conductors and connectors 28, with an isolating switch 36, which can be switched with no current flowing, providing a sufficiently wide isolating gap, as required, in order to electrically isolate the smoothing reactor 26 and the DC cable pot head 27 from one another.

The smoothing reactor 26 in turn makes contact with the converter valves 15 via a gas-insulated wall bushing. After the conversion process, the filtering and voltage transformation of the high-voltage alternating current are carried out on the AC side by the filter units 9, 10, 11 and 4 (FIGS. 2 and 3) as well as the transformer units 21, with the feeder units 6 (FIG. 2) providing the capability to interrupt the current flow to the components.

A control room, which is not shown, as well rooms for control, protection and communication cabinets are provided for controlling the converter station 1, with already known, conventional protection technology being used for monitoring the converter station.

Furthermore, the converter building 2 includes floor areas for auxiliary purposes, room air-conditioning systems, domestic areas for operational and maintenance personnel, workshops and the like.

The converter building 2 may, of course, be provided with self-initiating fire extinguishing systems, fire barrier walls, oil-proof walls or the like, depending on the respectively appropriate safety regulations.

Figure 5:
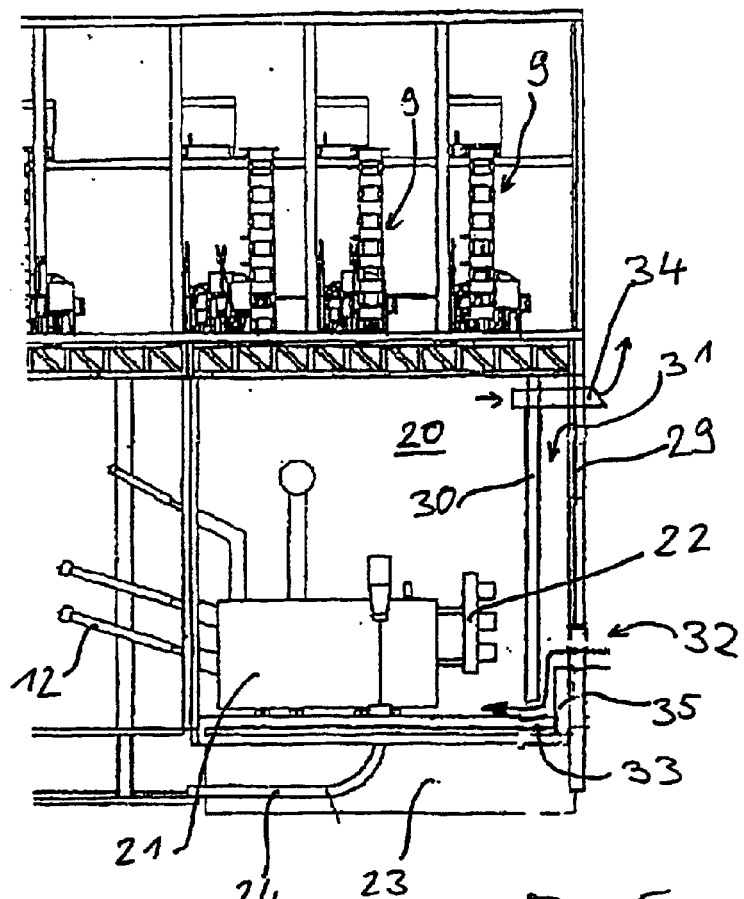
FIG. 5 shows a detail of an exemplary embodiment of the converter station according to the invention, in a view as shown in FIG. 3.

FIG. 5 shows a further exemplary embodiment of the converter station 1 according to the invention, in a view corresponding to that in FIG. 3, but enlarged. The transformer unit 21 is admittedly still cooled by oil/water cooling in this exemplary embodiment. Since, despite this cooling, residual heat is emitted from the transformer unit 21, additional air cooling is provided, but with a comparatively low cooling rating, and is driven by a fan which produces less audible noise.

In order to reduce any risk of fire, an inner fire barrier wall 30, which is composed of a noncombustible, fire-resistant material, can be seen alongside an outside wall 29 in the transformer area 20. In this case, the outside wall 29 and the fire barrier wall 30 bound a ventilation shaft 31. An outer ventilation gap 32 is provided for air to enter the ventilation shaft 31. As indicated by the lower arrow illustrated in FIG. 5, the outside air flows via a subsection of the ventilation shaft 31, through an inner ventilation gap 33 which is provided in the fire barrier wall, into the transformer area 20. An air outlet fan 34 allows the air to escape.

A wall region 35, which is likewise fire-resistant, is provided opposite the inner ventilation gap 33 and adjacent to the outside wall 29. In the event of fire, the flames or burning gases which are produced can enter the ventilation shaft 31 via the inner ventilation gap 33, with the fire-resistant walls 30 and 35 preventing any risk of the wall burning. The ventilation shaft 31 allows the flames or the burning gases to expand without any impediment, so that the risk of them emerging from the outer ventilation gap 32 is reduced by the double direction change for the flames, which is required in any case.

Gratings, which are not illustrated in the figures, with expanding material, whose volume is temperature-dependent, are advantageously arranged in the path of the inlet air between the inner ventilation gap 33 and the outer ventilation gap 32. In the event of a fire, the expanding material blocks the ventilation shaft 31, thus preventing smoke or flames from emerging from the converter building 2, or the entry of air to fan the fire.

Figure 6:
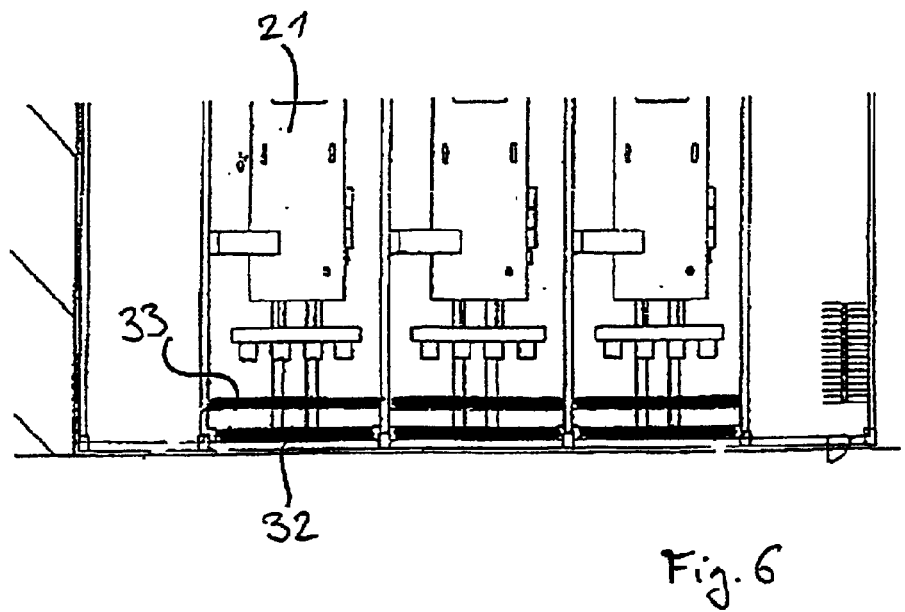
FIG. 6 shows a detail of a converter station as shown in FIG. 5, in a view as shown in FIG. 4.

FIG. 6 shows a converter station 1 as shown in FIG. 5, in a view as shown in FIG. 4. As can be seen, the outer ventilation gap 32 and the inner ventilation gap 33 extend in a transverse direction over the entire volume of the transformer units 21.

What is claimed is:

1. A converter station for a high-voltage DC connection between two three-phase AC voltage networks, comprising:
   a converter building which has a number of floors, and in which transformer units, converter valves, filter units, a gas-insulated switchgear assembly with feeder units, at least one cooling system, a DC cable pot head for electrical connection of a high-voltage cable carrying direct current, a smoothing reactor and gas-insulated busbars for electrical connection of these components are arranged, wherein the DC cable pot head and the smoothing reactor are arranged on the same floor as the converter valves and are electrically connected to one another via the air-insulated connecting device, with an air-insulated isolating switch being provided to produce an isolating gap between the DC cable pot head and the smoothing reactor.

2. The converter station as claimed in claim 1, wherein the DC cable pot head and the smoothing reactor are arranged jointly in a DC switchgear assembly area.

3. The converter station as claimed in claim 1, wherein the filter units include reactors, capacitor banks and resistors, with the resistors being arranged on the roof of the converter building.

4. The converter station as claimed in claim 1, wherein each cooling system has at least one fan, which is arranged in the interior of the converter building.

5. The converter station as claimed in claim 4, wherein each fan takes in and/or blows out the air through ventilation areas.

6. The converter station as claimed in claim 4, wherein water cooling is provided for cooling the transformer unit.

7. The converter station as claimed in claim 1, further comprising at least one internal fire-resistant fire barrier wall is provided in the converter building and is arranged at a distance from an outside wall forming a ventilation shaft; and
   in that an inner ventilation gap is provided in the fire barrier wall and an outer ventilation gap is provided in the outside wall, and the inner ventilation gap and outer ventilation gap are arranged at mutually different wall heights to prevent flames from emerging to the outside wall.

8. The converter station as claimed in claim 7, wherein a heat-sensitive expanding device, having a natural volume increase as a function of temperature, are arranged between the outer ventilation gap and the inner ventilation gap in the ventilation shaft.

* * * * *